United States Patent [19]

Gutelius

[11] Patent Number: 5,590,742
[45] Date of Patent: Jan. 7, 1997

[54] STAMPED CALIPER ADAPTER

[75] Inventor: Kenneth E. Gutelius, Orion, Mich.

[73] Assignee: ITT Automotive, Inc., Auburn Hills, Mich.

[21] Appl. No.: 475,144

[22] Filed: Jun. 7, 1995

[51] Int. Cl.$^6$ ................................. F16D 63/00
[52] U.S. Cl. .................. 188/70 R; 188/205 R; 188/341
[58] Field of Search .................. 188/70 R, 72.6, 188/106 A, 106 F, 106 P, 205 R, 341

[56] References Cited

U.S. PATENT DOCUMENTS

| | | | |
|---|---|---|---|
| 3,147,026 | 9/1964 | Schilberg | 188/205 R X |
| 4,854,423 | 8/1989 | Evans et al. | 188/70 R |
| 4,854,427 | 8/1989 | Baroni | 188/341 X |
| 4,995,481 | 2/1991 | Temple et al. | 188/70 R |
| 5,180,037 | 1/1993 | Evans | 188/70 R |
| 5,325,945 | 7/1994 | Walker | 188/341 |

*Primary Examiner*—Josie Ballato
*Attorney, Agent, or Firm*—Thomas N. Twomey; J. Gordon Lewis

[57] ABSTRACT

A two-piece stamped caliper adapter includes a cast iron anchor and a stamped steel adapter plate. The stamped adapter plate includes reinforcement ribs for providing structural rigidity and stiffness to withstand the loads imposed by a vehicle wheel brake system. A stamped caliper adapter makes a redundant drum brake assembly more readily adaptable to most vehicles and provides other cost-saving economies. In the preferred embodiment, the cast iron anchor and the stamped steel adapter plate are bolted together and the stamped steel adapter plate is spot welded to a drum brake assembly backing plate.

16 Claims, 2 Drawing Sheets

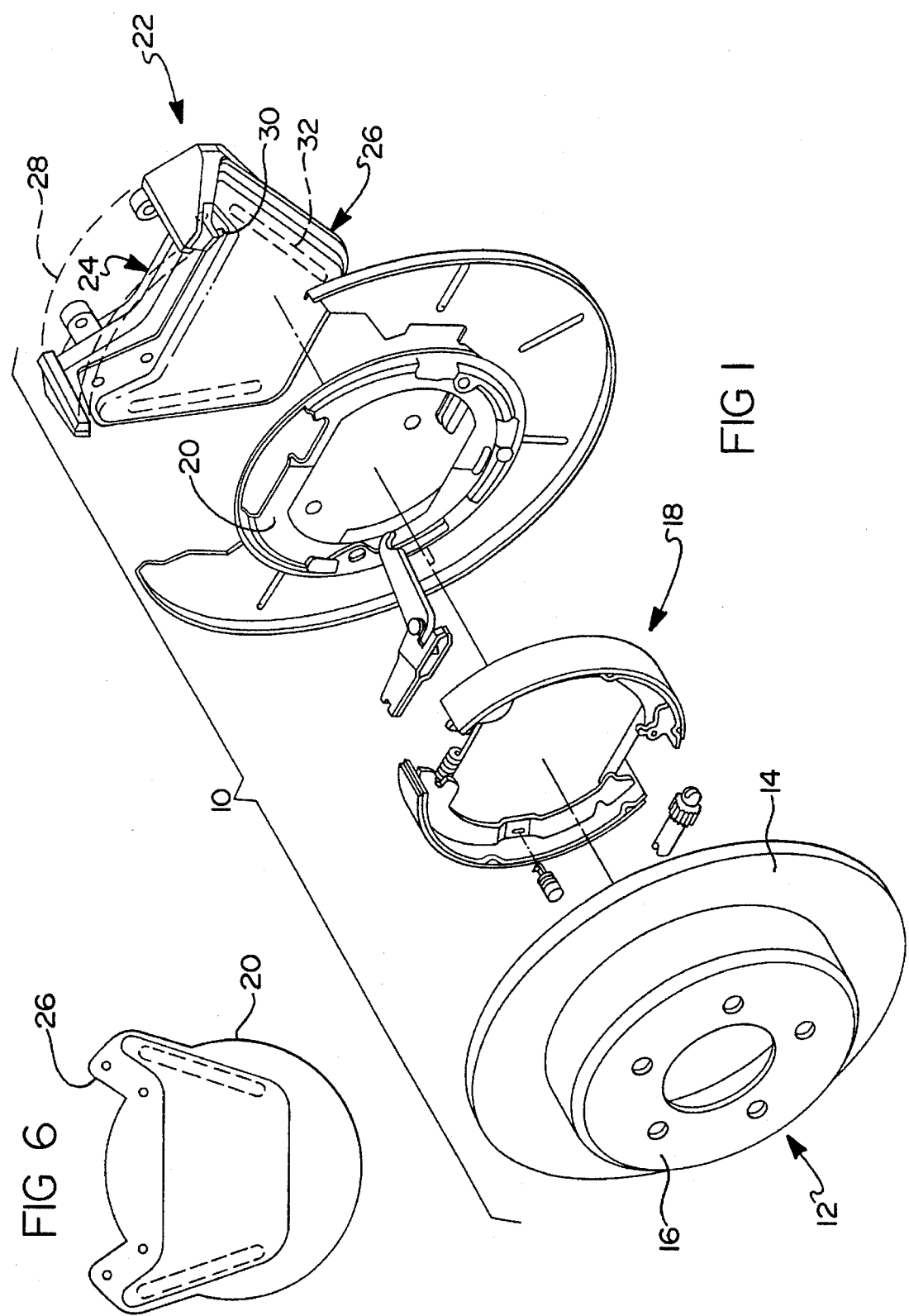

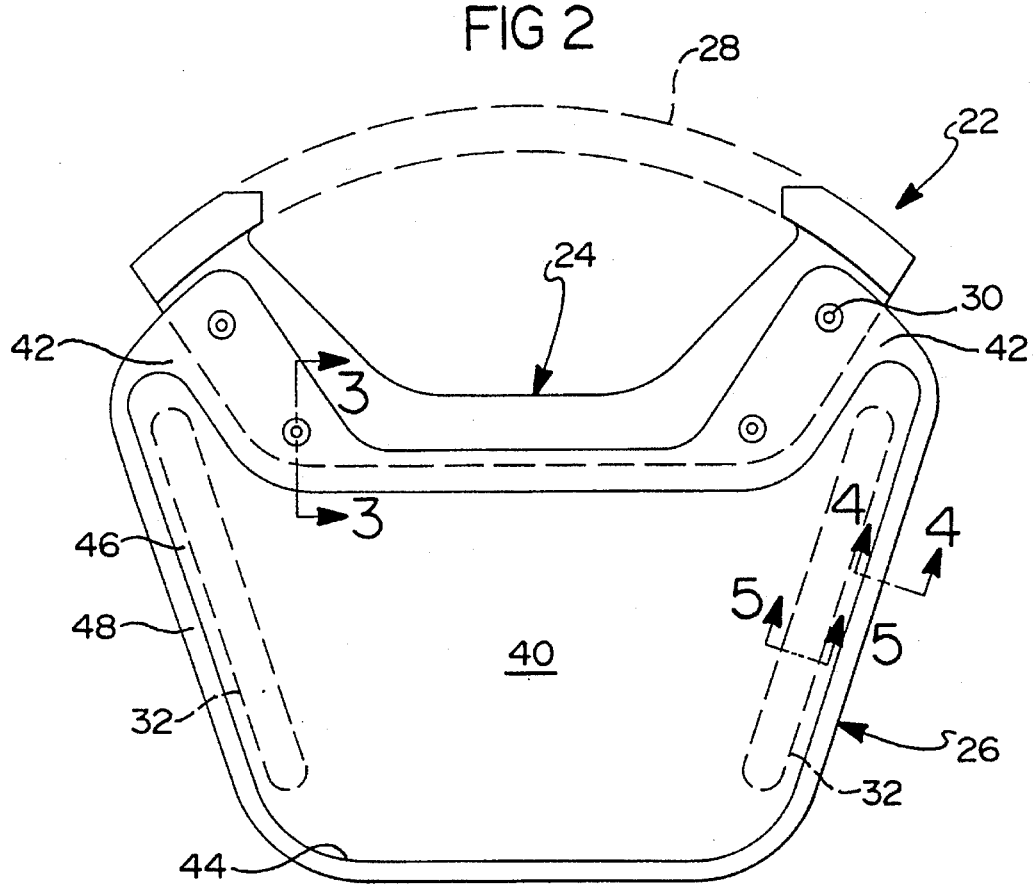
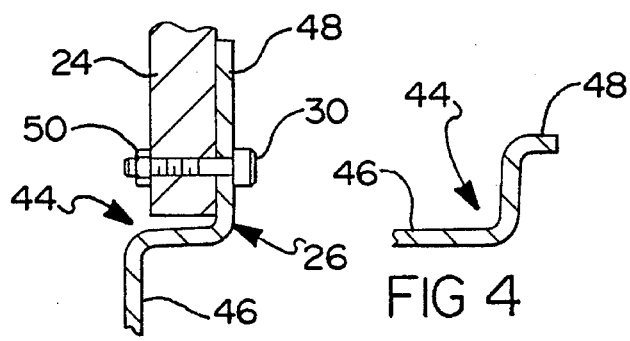
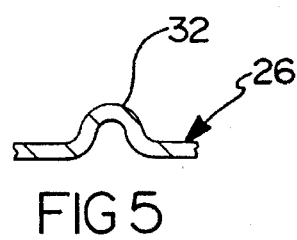

5,590,742

STAMPED CALIPER ADAPTER

BACKGROUND OF THE INVENTION

1. Field of the Invention

This invention relates to vehicle wheel brake systems. More particularly, this invention relates to a caliper adapter for use in vehicle brake systems that include a disc brake assembly and a redundant drum brake assembly for providing a parking brake function.

2. Description of the Prior Art

In modern day vehicles, wheel brake assemblies are used that are conventionally known as disc brakes. Disc brakes are preferred for many applications for widely-known reasons. The use of disc brakes for rear wheels on a vehicle, however, introduces certain problems. For example, disc brakes are not ideal for use as a parking brake.

One problem associated with the use of disc brakes for a parking brake, includes a potential deformation of the rotor, which the brakes act upon. When disc brakes have been used for decelerating the rotation of the rear wheels of a vehicle, the disc brake pads typically become very hot. When these same pads are then used for a parking brake function, the pads are clamped about the rotor in a fixed position for a long period of time. The relatively large amount of heat on the disc brake pads has the potential of introducing deformities into the rotor, which can interfere with optimum function of the disc brakes in later braking applications.

Accordingly, it has been proposed to include a redundant drum brake assembly for vehicles that have disc brakes on the rear wheels. Such a configuration would include a "drum-in-hat" rotor assembly that has disc brakes acting on a disc portion of the rotor and a drum brake assembly acting on a rotor barrel or hat portion. The drum brakes, in such systems, are used solely for a parking brake function in order to avoid the potential difficulties introduced by using the disc brakes as discussed above.

The presence of a redundant drum brake assembly introduces additional parts and weight to the vehicle brake system. Moreover, the inclusion of the drum brake assembly introduces design challenges in that the brake assembly must be capable of supporting the disc brakes and the drum brakes such that each are functional as required by a particular application. In some instances, special caliper adapters have been used for mounting the disc brakes and for supporting the redundant drum brake assembly. Such adapters are functional, however, they introduce additional weight and, because of their size, are cumbersome and may not be readily adaptable to many vehicle wheel systems. Therefore, it is desirable to provide improved components for vehicle wheel brake systems that include a redundant drum brake for a parking brake feature.

This invention provides an improved caliper adapter that mountingly supports the disc brake assembly and redundant drum brake assembly in an effective manner while also providing space, weight and cost saving advantages.

SUMMARY OF THE INVENTION

In general terms, this invention provides a vehicle caliper brake adapter having a first portion made of first type of metal that is adapted to mountingly support a disc brake assembly. The brake adapter has a second portion that is made of a second type of metal, which is connected to the first portion. The second portion has a base and two wings that extend away from the base. The wings preferably provide a connection point between the first and second portions of the brake adapter. The base includes at least one reinforcement rib to increase the structural rigidity of the second portion such that it can withstand the forces imposed during the application of a parking brake, for example.

In the preferred embodiment, the first portion of the brake adapter is made of cast iron and the second portion is made from a single stamping of steel. The steel second portion is preferably bolted to the cast iron first portion. The use of steel as a base or second portion of the adapter results in a lighter weight adapter that enhances space, manufacturing and other cost economies.

Various other features and objects of this invention will become apparent to those skilled in the art from the following detailed description of the preferred embodiments.

BRIEF DESCRIPTION OF THE DRAWINGS

FIG. 1 is a perspective exploded view of a vehicle brake assembly including a brake caliper adapter designed in accordance with this invention.

FIG. 2 is a planar view of a presently preferred embodiment of a brake adapter designed in accordance with this invention.

FIG. 3 is a partial cross-sectional view highlighting portions of the embodiment of FIG. 2.

FIG. 4 is a partial cross-sectional view highlighting portions of the embodiment of FIG. 2.

FIG. 5 is a partial cross-sectional view illustrating a reinforcement rib as used with the embodiment of FIG. 1.

FIG. 6 is a planar view of an integral backing plate and second portion of a brake adapter.

DETAILED DESCRIPTION OF THE PREFERRED EMBODIMENTS

FIG. 1 illustrates, in perspective exploded view, a vehicle wheel brake assembly 10. This type of assembly is commonly known as a drum-in-hat assembly, in part because of the configuration of rotor 12. Rotor 12 includes a disc portion 14 and a drum or barrel portion 16. Drum brake assembly 18 is provided to act upon an inner surface of drum portion 16 in order to provide a parking brake feature. Backing plate 20 provides a mounting surface for drum brake assembly 18.

A disc brake assembly is preferably provided for acting upon disc portion 14 of rotor 12 in order to provide a conventional braking function. Two-piece stamped caliper adapter 22 provides an advantageous device for mounting a disc brake assembly for acting upon disc portion 14. Two-piece caliper adapter 22 includes first portion 24 and second portion 26. First portion 24, also referred to as an anchor, preferably is made of cast iron and is adapted to mountingly support a disc brake assembly (shown in phantom at 28). The disc brake assembly 28 and drum brake assembly 18 are essentially conventional and, therefore, will not be further described in this specification.

Second portion 26 of caliper adapter 22 differs from previous attempts at providing such an adapter for drum-in-hat brake systems, in part, because second portion 26 is made from a single stamping of steel. Second portion 26 is preferably bolted to first portion 24 through the use of bolts 30. Bolts 30 can be a nut and bolt configuration, or, alternatively, bolts 30 can be threaded members that are received within threaded bores defined through first portion 24. Second portion 26 is preferably spot welded to and connected with backing plate 20. Accordingly, second portion 26 provides support for drum brake assembly 18 while also supporting first portion 24, which mounts disc brake assembly 28 in proper position. Therefore, second portion 26 is subjected to loads as caused by actuation of either drum brake assembly 18 or disc brake assembly 28. Second portion 26 also serves the function of transmitting such loads to an axle flange (not illustrated). It is therefore necessary that second portion 26 be relatively rigid and structurally capable of withstanding such loads. Accordingly, this invention includes the provision of reinforcement ribs 32 on second portion 26 to increase the stiffness and rigidity of the caliper adapter. Further, the mounting or connection of first portion 24 to anchor 26 further provides greater stiffness and structural rigidity. When first portion 24 is bolted to second portion 26, as generally shown in FIG. 1, the cast iron anchor 24 contributes to the stiffness of the overall assembly of adapter 22.

In the most preferred embodiment, second portion 26 and backing plate 20 are stamped separately and spot welded together. In an alternative embodiment as shown in FIG. 6, second portion 26 and backing plate 20 are stamped as a single, integral part. In such an embodiment, it is desirable to include a flange, jacket, or covering that would prevent any dirt, debris or water from intruding into the functional space of drum brake assembly 18. The presence of the reinforcement ribs required for the structural rigidity of such an integral part introduces the potential intrusion of such undesirable contaminants.

FIG. 2 illustrates, in more detail, the most presently preferred embodiment of the stamped caliper adapter 22. Second portion 26 includes base 40 and wings 42, which extend upwardly (according to the drawing) and away from base 40. First portion 24 is preferably connected to second portion 26 by a connection through wings 42 as illustrated. In the illustrated embodiment, a single reinforcement rib 44 is illustrated by the broken lines. Reinforcement rib 44 is defined by an intersection between a first surface 46 and a second surface 48 on second portion 26. As illustrated, reinforcement rib 44 essentially tracks around the perimeter of second portion 26, including a portion of wings 42. First surface 46 is preferably generally planar and lies within a single plane that is parallel and below (as viewed into the page) a plane containing second surface 48.

FIG. 4 is a cross-sectional view taken along the line 4—4 of FIG. 2. FIG. 4 more clearly illustrates the spacial relationship between first surface 46 and second surface 48 of second portion 26. Reinforcement rib 44 is defined by the sloping flange between first surface 46 and second surface 48.

FIG. 3 is a partial cross-sectional view taken along the line 3—3 of FIG. 2. FIG. 3 illustrates the presently preferred connection between first portion 24 and second portion 26. Bolt 30 fits through bores defined in first portion 24 and second portion 26, as illustrated. In the illustrated embodiment, bolt 30 is connected with a nut 50 in order to secure the two portions of adapter 22 together. Alternatively, the bore defined through first portion 24, which is preferably cast iron material, can be a threaded bore that receives a threaded bolt 30 in order to fasten the two portions of adapter 22 together.

FIG. 5 illustrates, in cross-sectional view, another preferred embodiment of a reinforcement rib. Rib 32, as illustrated in FIG. 5 corresponds to the reinforcement ribs illustrated in the embodiment of FIG. 1, for example. By providing such raised reinforcement ribs in the stamped steel second portion 26, the structural rigidity of that piece is enhanced. Such reinforcement ribs are important in order to provide a sufficiently strong adapter, designed in accordance with this invention.

Other mounting devices for drum-in-hat wheel brake assemblies were made of all cast iron in order to provide the necessary stiffness or structural integrity. This invention provides a more efficient device in that stamped steel is lighter weight, takes up less volume, and is less costly for manufacturing purposes. The use of a stamped caliper adapter designed in accordance with this invention provides improved vehicle economies in that the weight of the brake system is reduced, improved manufacturing economies in that cost savings in materials and space are achieved, and design economies in that the lesser volume required by a stamped caliper adapter designed in accordance with this invention makes a drum-in-hat wheel brake assembly more readily adaptable to most vehicles.

The preceding description is exemplary rather than limiting in nature. Variations and modifications will become apparent to those skilled in the art that do not depart from the purview and spirit of this invention. The scope of this invention is to be limited only by the appended claims.

What is claimed is:

1. A vehicle wheel brake system, comprising:

a rotor having a disc portion and a drum portion;

a disc brake assembly for acting on said disc portion of said rotor to effect a deceleration of said rotor;

a drum brake assembly for acting on said drum portion of said rotor to effect a parking brake function independent of said disc brake assembly;

a backing plate supportingly mounting said drum brake assembly within said rotor drum portion; and a two-piece adapter having a first portion made of a first metal and supportingly mounting said disc brake assembly about said rotor disc portion and a second portion fastened to said first portion, said second portion being made of a second metal and being fixed to said backing plate.

2. The system of claim 1, wherein said first portion of said adapter is made from cast iron.

3. The system of claim 1, wherein said second portion of said adapter is made from a single stamping of steel.

4. The system of claim 1, wherein said second portion of said adapter is welded to said backing plate.

5. The system of claim 1, wherein said second portion is integrally formed with said backing plate.

6. The system of claim 1, wherein said adapter second portion comprises a single stamping of steel that further comprises a reinforcement rib along a perimeter of said second portion, adjacent and essentially following an outer edge of said second portion.

7. The system of claim 1, wherein said adapter second portion comprises a single stamping of steel that has a plurality of reinforcement ribs.

8. The system of claim 7, wherein said adapter second portion comprises a base portion and a pair of essentially flat wing portions extending from said base.

9. The system of claim 8, wherein said reinforcement ribs are disposed on said base portion, said wing portions are fastened to said adapter first portion and said base portion is fastened to said backing plate.

10. A vehicle caliper brake adapter, comprising:

a first portion made of a first metal and adapted to mountingly support a disk brake assembly; and a second portion made of a second metal and having a base and two wings extending away from said base, said wings being connected to said first portion, said base having a reinforcement rib to increase the structural rigidity of said second portion.

11. The adapter of claim 10, wherein said first portion is made of cast iron and said second portion is made of a single stamping of steel.

12. The adapter of claim 10, wherein said first portion is welded to said second portion.

13. The adapter of claim 10, wherein said reinforcement rib is defined about a periphery of said base.

14. The adapter of claim 13, wherein said reinforcement rib extends into at least a portion of each of said wings.

15. The adapter of claim 10, wherein said base has a first surface in a first plane and a second surface extending inwardly from an outer periphery of said base in a second plane and wherein said rib comprises an intersection between said first and second surfaces.

16. The adapter of claim 10, further comprising a plurality of reinforcement ribs.

* * * * *